(No Model.)

W. R. DUNN.
COMPUTING SCALE.

No. 588,526.  Patented Aug. 17, 1897.

2 Sheets—Sheet 1.

WITNESSES:
Edward Thorpe.

INVENTOR
W. R. Dunn
BY Munn & Co
ATTORNEYS.

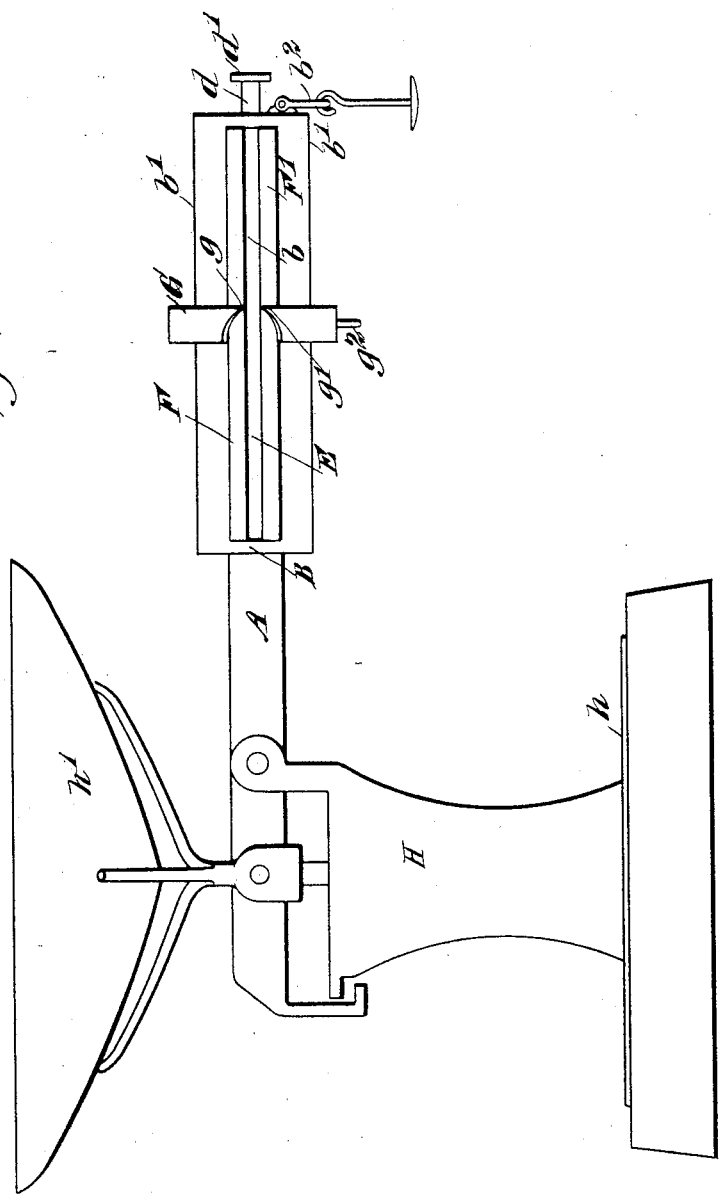

UNITED STATES PATENT OFFICE.

WILLIAM R. DUNN, OF ALTON, INDIANA, ASSIGNOR TO HIMSELF, JOHN T. HOLLCROFT, TEMPLE H. DUNN, LYCURGUS HARRISON, AND ABRAHAM N. PECKINPAUGH, OF SAME PLACE.

COMPUTING-SCALE.

SPECIFICATION forming part of Letters Patent No. 588,526, dated August 17, 1897.

Application filed March 14, 1895. Serial No. 541,676. (No model.)

*To all whom it may concern:*

Be it known that I, WILLIAM R. DUNN, of Alton, in the county of Crawford and State of Indiana, have invented certain new and useful Improvements in Computing-Scales, of which the following is a full, clear, and exact description.

This invention relates to certain improvements in that class of computing or price-indicating weighing-scales wherein a movable weight is adapted to traverse two beams, one of which is graduated to indicate pounds and ounces and the other of which is graduated to indicate the price per pound in cents of the substance being weighed; and the object of the invention is to provide a device of this character of a simplified and improved construction which shall present certain features of novelty and advantages for use over similar devices heretofore employed, all as will be hereinafter fully set forth.

The novel features of the invention will be carefully defined in the claims.

Figure 1:
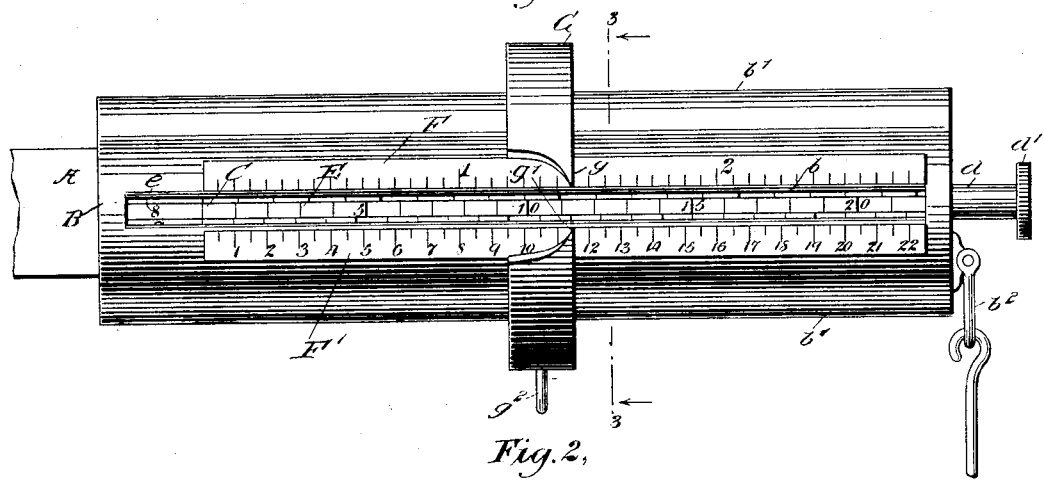
Figure 2:
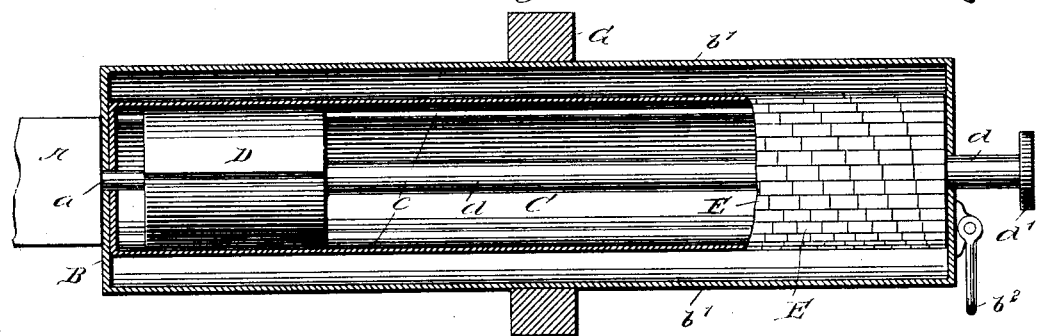
Figure 3:
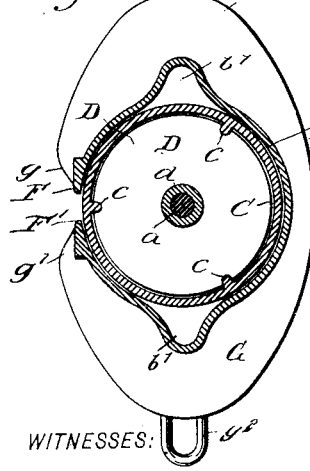
Figure 4:
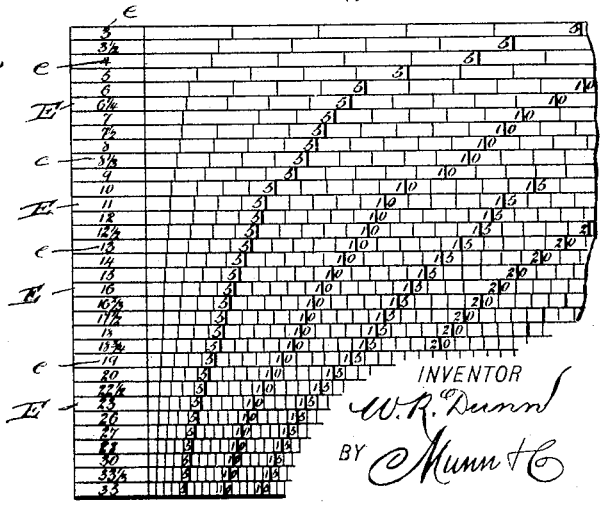

In the accompanying drawings, illustrating the invention, Figure 1 is an elevation of the beam of a computing-scale embodying my improvements, and Fig. 2 is a vertical longitudinal section taken through the same. Fig. 3 is a vertical cross-section taken through the beam on the line 3 3 in Fig. 1, showing the sliding weight in place on the same; and Fig. 4 is a stretch-out showing a portion of the graduations on the periphery of the price-indicating beam. Fig. 5 is a side elevation of a weighing-scale of ordinary construction, having a platform for weighing articles in bulk and a scoop for weighing small quantities and provided with my improvements.

In the views, A represents the beam of a weighing-scale H, which may be of any desired construction, being preferably of that class of scales which are provided with independent supports for articles to be weighed—as, for example, a platform $h$ for weighing in bulk and a scoop $h'$ for weighing small quantities.

At its extremity the beam A is provided with a projecting lug or stud $a$, circular in cross-section, as seen in Fig. 3, supporting at its inner end the inner end of a tubular casing B and also forming a journal whereon turns the price-indicating beam C, located inside the casing B, as clearly seen in the drawings. The beam C comprises a tubular rotative body having longitudinal guides $c$ formed on its inside, and inside the said body is mounted to slide on said guides $c$ a movable weight or counterpoise D, having at one side a projecting tubular extension $d$, journaled to rotate on the bearing-lug $a$, as clearly seen in Fig. 3. The extension $d$ projects through the outer end of the casing B and forms a handle for the manipulation of the rotative price-indicating beam C and also of the sliding counterpoise D, being provided at its extremity with a milled head $d'$.

The beam C is provided on its periphery with longitudinal series of graduations E, as clearly seen in Figs. 2 and 4, and at one end of the beam an index-character $e$ is printed at the end of each series of graduations, said character $e$ being made to indicate the price per pound of the materials in the weighing out of which its particular series of graduations E is to be used.

There may be any desired number of graduations E, and in Fig. 4 I have shown the index-characters $e$ of said series running from "3," indicating three cents per pound, to "35," indicating thirty-five cents per pound; but it is evident that said indexes $e$ may be increased or varied as may be desired.

The casing B, which constitutes the weighing-beam, is provided in its side with a longitudinal slot $b$ of sufficient width to expose at one time but one of the longitudinal series of graduations E on beam C, together with the index-character $e$ of said series, and along opposite sides of said slot, at the top and bottom thereof, as seen in Fig. 1, graduated scales F F' are secured to the side of the casing, the upper scale F being graduated into pounds and ounces and the lower scale F' being graduated into pounds and half-pounds, as seen in Fig. 1, and each of said scales F F' extends along the side of the slot from the first graduation of the series E on beam C, as seen at the left in Fig. 1, to the opposite end of the slot.

The casing B is provided at opposite sides with longitudinal guides $b'$, and a weight or pea G is mounted to slide on said casing, being guided by said guides $b'$ and provided at its front portion with index-fingers $g\ g'$, adapted, as said weight is slid along the casing, to play along the respective scales F F' thereon. At its lower part the pea G is provided with an eye $g^2$ to receive an auxiliary weight, whereby the weight of said pea may be increased or diminished, and at the end of the casing B is formed a similar eye $b^2$ to support a similar weight in a well-known way. The scale F is designed for use with articles to be weighed in the scoop, and the scale F' is designed for use with articles to be weighed on the platform. In using the device the handle $d$ is manipulated to rotate the beam C far enough to bring the index $e$ thereon which corresponds to the price per pound of the article to be weighed into position to be seen through the slot $b$ in casing B. For example, if it is desired to weigh out ten cents' worth of sugar at three cents a pound the beam C is turned until the index "3" and its corresponding scale E appear at the slot $b$, whereupon the pea G is slid along until its index $g$ corresponds with the graduation at "10" on the scale E. The sugar is then placed in the scoop of the scale, and when the same has been balanced a glance at the scale F shows that the index $g$ on the pea G indicates three pounds three and a third ounces on said scale, giving the weight of the sugar without necessitating any computation on the part of the operator.

When it is desired to weigh articles in bulk, the article is placed on the platform and the pea G is slid along to the proper position to effect a balance. The counterpoise D may be employed for balancing articles placed in the scoop of the scale—as, for example, when a plate or dish is placed therein to hold articles sold by weight. To effect this, the handle $d$ is manipulated to draw the counterpoise D over to the right in the casing until the dish in the scoop is balanced. The counterpoise D may also be employed to balance the article in the pan after it has been weighed when it is desired to mix different articles. The use of said counterpoise for this purpose will be apparent.

I do not wish to be understood as limiting myself to the exact arrangement and construction of the device as herein set forth, since it is evident that the same is susceptible of some modification without departing from the principles of the invention.

Having thus described my invention, I claim as new and desire to secure by Letters Patent—

1. In a weighing-scale, the combination of a beam having a stud projecting from its end, a tubular casing secured on the end of said beam concentric with and surrounding said stud, and provided with a longitudinal slot and a series of graduations adjacent thereto, a weight slidable along said casing, a tubular price-indicating beam rotatively mounted on said stud inside the said casing and provided with a series of graduations arranged to appear at the slot in the casing, said price-indicating beam having a guide formed longitudinally along it, a counterpoise engaging said guide and slidable therealong, and a handle secured to said counterpoise, substantially as set forth.

2. In a computing-scale, having independent supports for articles to be weighed, the combination of a hollow weighing-beam having a longitudinal opening formed in it and provided at the side of said opening with two series of graduations marked on it and adapted for use, respectively, with the respective independent supports, a price-indicating beam arranged to turn in the hollow of the weighing-beam and provided with a plurality of price-indicating graduations adapted when the beam is turned to appear at the opening in the weighing-beam, and a weight arranged to slide along the weighing-beam and provided with indexes to traverse the respective scales on the weighing-beam and the scale on the price-indicating beam at the opening in the weighing-beam, substantially as set forth.

3. In a computing-scale, the combination of a hollow weighing-beam, having a longitudinal slot and graduations along the same and having bearings at its opposite ends, a price-indicating beam mounted to turn in the hollow of the weighing-beam on said bearings, and having a plurality of price-indicating graduations adapted when the price-indicating beam is turned, to appear at the slot in the weighing-beam, a handle mounted to move longitudinally of the price-indicating beam but arranged to turn with the same whereby the said beam may be rotated, said handle projecting from the said beam and being adapted when moved longitudinally to vary the adjustment of the scale, and a weight arranged to slide along the weighing-beam and having indexes to traverse the scales on the same and on the price-indicating beam at the opening in the weighing-beam, substantially as set forth.

4. In a weighing-scale, the combination of a hollow rotatively-mounted beam having a longitudinal internal guide, a counterpoise slidingly mounted in said beam engaging said guide and held against turning in said beam thereby, and a handle fixed to said counterpoise and adapted when turned to turn the beam and when moved longitudinally, to slide said counterpoise in the hollow of the beam and vary the adjustment of the scale, substantially as set forth.

WILLIAM R. DUNN.

Witnesses:
JOHN T. HOLLCROFT,
EDWARD A. HOLLCROFT.